United States Patent [19]

Migdal

[11] Patent Number: 4,609,049
[45] Date of Patent: Sep. 2, 1986

[54] ROTARY WHEEL TYPE ROCK PICKER

[76] Inventor: Thomas Migdal, Box 196, Lipton, Saskatchewan, Canada, S0G 3B0

[21] Appl. No.: 601,045

[22] Filed: Apr. 16, 1984

Related U.S. Application Data

[63] Continuation-in-part of Ser. No. 371,594, Apr. 26, 1982.

[51] Int. Cl.⁴ ............... A01B 43/00; A01D 17/18; A01D 19/02
[52] U.S. Cl. .................. 171/63; 171/98; 171/107; 171/128; 172/544; 172/553; 37/141 R; 198/512
[58] Field of Search .................. 171/63, 64, 65, 87, 171/89, 90, 92, 95, 97, 98, 101, 105, 107, 110, 112, 115, 116, 128, 129; 172/553, 544; 56/364; 198/512; 37/141 R

[56] References Cited

U.S. PATENT DOCUMENTS

| | | | |
|---|---|---|---|
| 100,168 | 2/1870 | Mallory | 171/115 X |
| 624,852 | 5/1899 | Nugent | 171/63 |
| 2,296,851 | 9/1942 | Henry | 171/63 X |
| 2,503,465 | 4/1950 | Baugh | 171/110 X |
| 2,725,700 | 12/1955 | Fahrenholz | 171/63 X |
| 2,781,623 | 2/1957 | Anderson | 171/63 |
| 3,261,408 | 7/1966 | Simonar et al. | 171/63 |
| 3,443,644 | 5/1969 | Schindelka | 171/63 |
| 4,029,151 | 6/1977 | Hehr | 171/65 |
| 4,040,489 | 8/1977 | Hulicsko | 171/63 |
| 4,296,818 | 10/1981 | Malinowski et al. | 171/63 |
| 4,449,309 | 5/1984 | Hemphill | 37/141 R |
| 4,496,003 | 1/1985 | Bynum | 171/63 |
| 4,512,146 | 4/1985 | Klinner | 56/364 |

FOREIGN PATENT DOCUMENTS

| | | | |
|---|---|---|---|
| 697118 | 9/1953 | Australia | 198/512 |
| 38 | 7/1899 | Austria | 171/112 |
| 725363 | 1/1966 | Canada | 37/141 R |
| 1082929 | 8/1980 | Canada | 171/63 |
| 190522 | 9/1907 | Fed. Rep. of Germany | 171/98 |
| 1041718 | 10/1958 | Fed. Rep. of Germany | 171/112 |

Primary Examiner—Robert A. Hafer
Assistant Examiner—Terrence L. B. Brown
Attorney, Agent, or Firm—Stanley G. Ade; Adrian D. Battison

[57] ABSTRACT

A wheel mounted pull type chassis includes a side hitch bar for securement to a tractor or the like. A reel assembly is journalled for rotation and is situated transversely at the front of the chassis and picks up rocks, stones, dirt, etc. and deposits same on an upwardly and rearwardly inclining slotted apron with the teeth of the pick up bars at the reel passing through the apron teeth and depositing the picked up material into a screening wheel journalled for rotation about a generally horizontal but inclined longitudinal axis so that the wheel is tipped rearwardly from the vertical. The periphery of the wheel is slotted. It is supported upon a pair of spaced apart support wheels one wheel of which is driven and which engage a track around the outer periphery of the wheel. Three equidistantly spaced rear support wheels engage the rear of the periphery of the wheel for added support. The dirt and small stones sift through the slotted periphery of the screening wheel as it rotates and the larger stones and rocks are carried upwardly by the interior of the wheel to be dropped vertically from the upper side of the wheel into a drum type container also carried in the chassis rearwardly of the wheel but having an open upper side veritcally below the upper side of the screening wheel.

4 Claims, 10 Drawing Figures

ROTARY WHEEL TYPE ROCK PICKER

BACKGROUND OF THE INVENTION

This invention relates to new and useful improvements in rock pickers, particularly rock pickers of the rotary wheel type and is a Continuation-in-Part of application, Ser. No.: 371,594, filed Apr. 26th, 1982.

Conventionally such rock pickers include a screened wheel which is situated within a chassis and inclines rearwardly from the vertical. The lower periphery of the wheel is adapted to engage the ground and pick up material as it rotates, said material then being screened by the wheel with the retained material being dropped into a container as it is elevated by the rotation of the wheel.

Examples are shown in Canadian patent No. 946,626 and U.S. Pat. No. 4,153,114.

However these suffer from several disadvantages such as difficulty in operating over rough ground.

SUMMARY OF THE INVENTION

The present invention overcomes such disadvantages by providing a screening wheel journalled for rotation transversely of a supporting frame and being rotatable by a source of power. A pick up reel is journalled for rotation transversely of the chassis and picks up the material from the ground and elevates it along a rake component so that it is dumped into the lower forward side of the screening wheel which then screens the material and rotates the retained material upwardly and drops same into a dump bucket.

Another advantage of the present invention is the fact that it is readily adapted to be driven by hydraulic motors from the hydraulic system of the tractor or the like which pulls the pull type implement.

Yet another advantage of the invention is to provide a device in which the pick up reel and rake components are mounted in one unit which is easily raised and lowered relative to the ground depending upon conditions.

Yet another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1A is a partial view of the screening wheel showing a modified construction thereof.

In the drawings like characters of reference indicate corresponding parts in the different figures.

DETAILED DESCRIPTION

Figure 1:
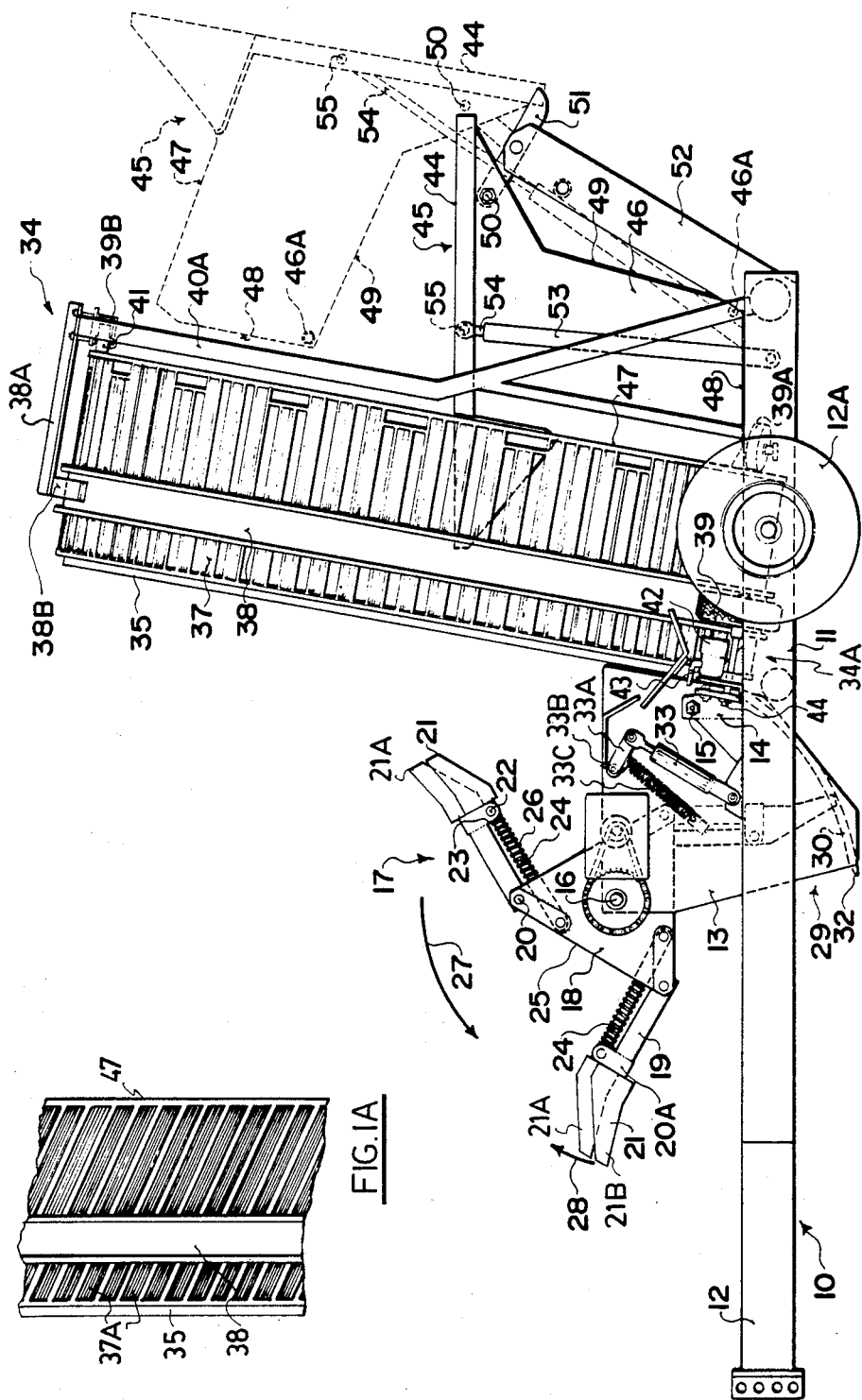
FIG. 1 is a side elevation of the device.
Figure 2:
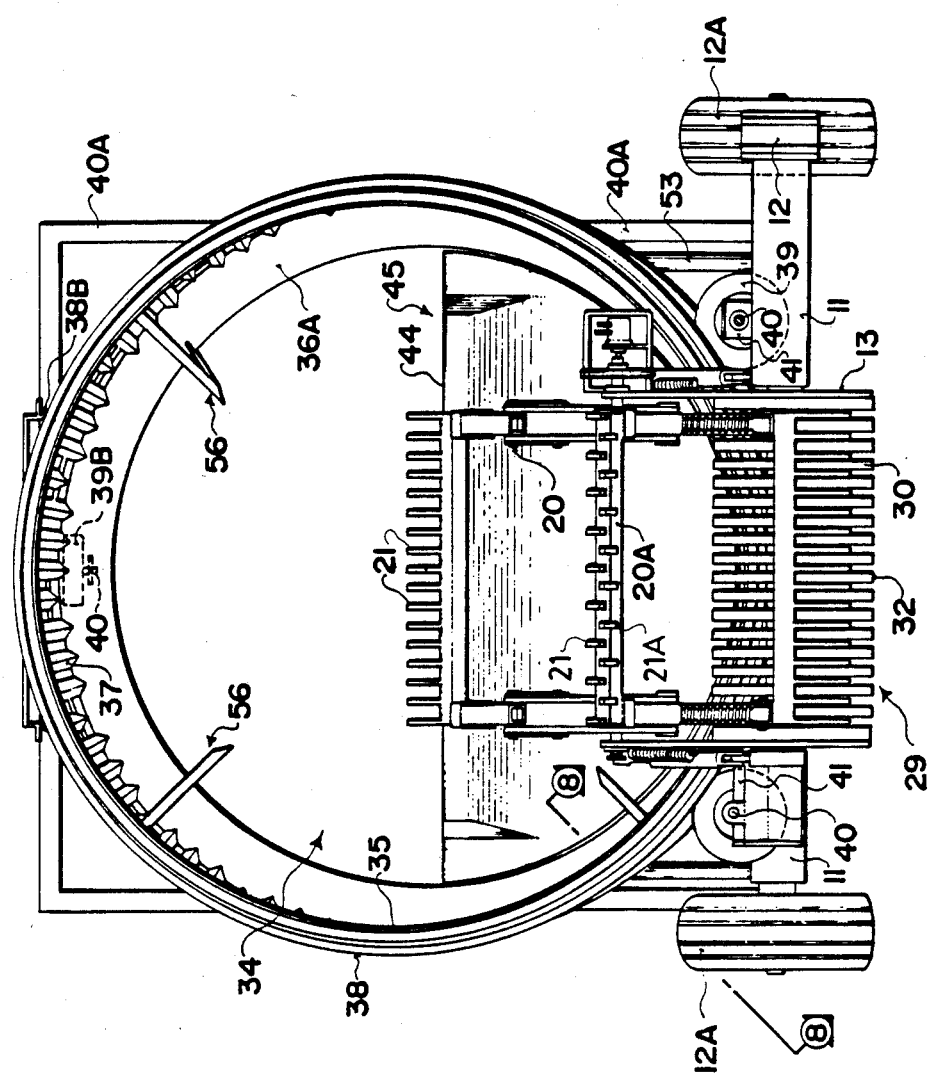
FIG. 2 is a front view thereof.
Figure 3:
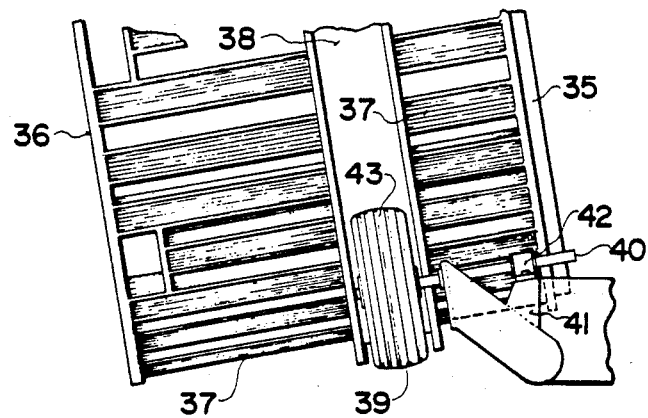
FIG. 3 is a fragmentary side elevation of the screening wheel per se showing one main support wheel.
Figure 4:
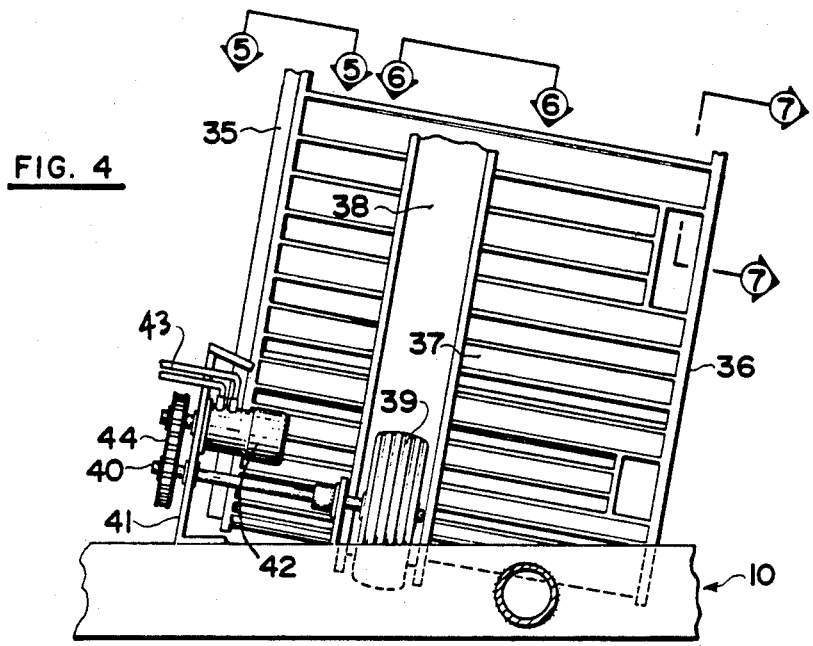
FIG. 4 is a view similar to FIG. 3 but showing the opposite main support wheel with the drive attached thereto.
Figures 5, 6, 7:
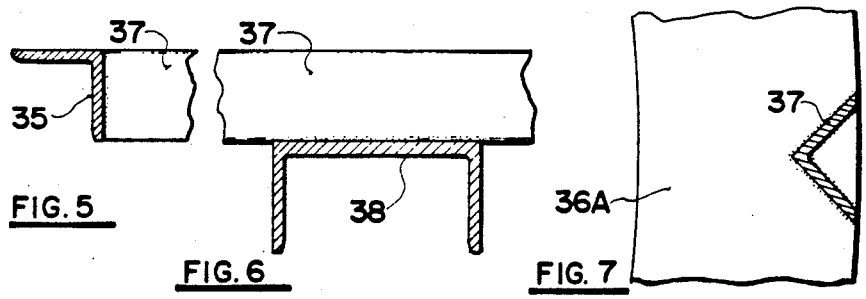
FIG. 5 is a fragmentary cross sectional view along the line 5—5 of FIG. 4.
FIG. 6 is a fragmentary cross sectional view along the line 6—6 of FIG. 4.
FIG. 7 is a fragmentary cross sectional view along the line 7—7 of FIG. 4.
Figure 8:
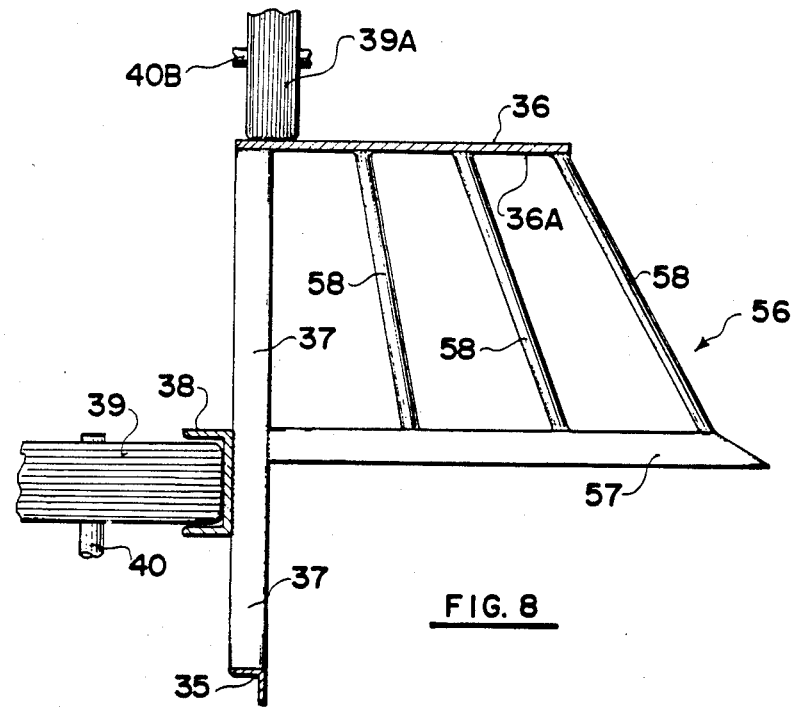
FIG. 8 is a cross sectional view along the line 8—8 of FIG. 2.
Figure 9:
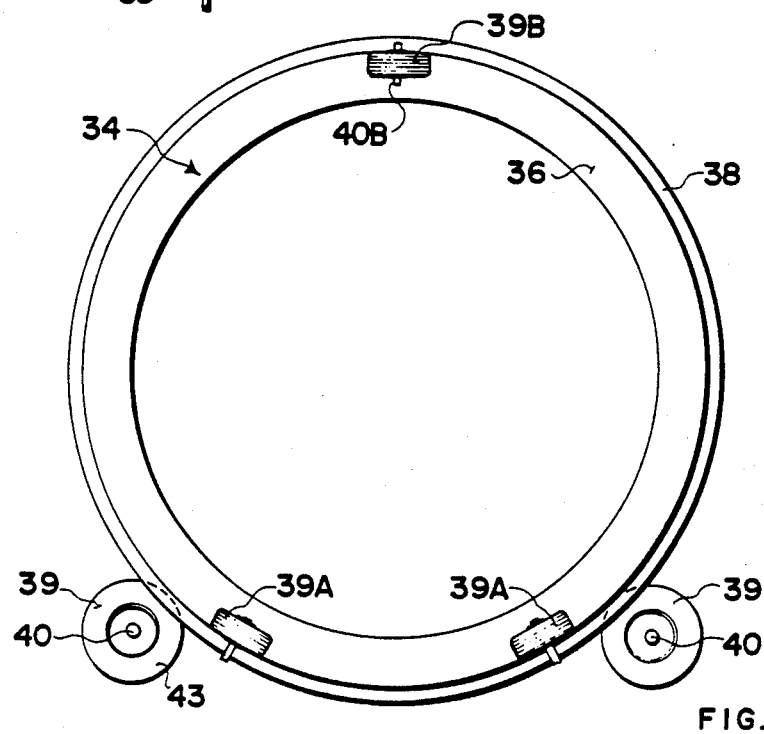
FIG. 9 is a rear view of the screening wheel showing the support wheels therefor.

Proceeding therefore to describe the invention in detail, reference character 10 illustrates generally, a supporting chassis including longitudinal side members 11 and forwardly extending hitch bar component 12 extending forwardly from one of the longitudinal side chassis members 11.

Ground engaging wheels 12A are mounted for rotation one upon each side of the support chassis and the hitch bar 12 is securable to a source of motive power such as a tractor or the like so that the main rock picker is pulled by the tractor with the pick up portion thereof situated to one side of the tractor.

A pair of spaced and parallel side plates 13 are situated adjacent the inside of each longitudinal chassis member 11 and are pivoted to upwardly extending support brackets 14 by means of main pivots 15.

An axle 16 is journalled for rotation between the side plates 13 adjacent the upper ends thereof, said axle forming part of a pick up reel collectively designated 17. Triangular support plates 18 are secured to the axle adjacent the outer ends thereof and a plurality of pick up arms 19 are secured to and extend downward from the corners 20 of the triangular plates 18. Cross bars or pick up bars 20A extend between the outer ends of arms 19 and carry a plurality of spaced and parallel pick up teeth 21, 21A in the form of plates which are welded to the bars 20A. The plates 21, 21A extend outwardly from the cross bars 20A.

The cross bars are pivotally secured by means of pivot pins 22 to brackets 23 extending at right angles from the ends of the arms 19 and a spring mounting rod 24 is anchored by the inner end thereof to the side 25 of the triangular plate 18. This rod passes freely through an aperture (not illustrated) in the pivot rod 22 and a compression spring 26 surrounds the rod 24 and reacts between the side 25 of plate 18 and the bracket 23 so that with the pick up reel rotating in the direction of arrow 27, the teeth 21 can pivot in the direction of arrow 28 if they strike an obstruction, against the pressure of spring 26 which returns them to the pick up position once the obstruction has been cleared.

Also mounted upon the side plates 13 is a rake component collectively designated 29. This comprises a plurality of spaced and parallel rake strips or bars 30 extending downwardly from a transversely situated upper member 31 and the relationship of the pick up teeth 21 and the rake bars 30 is such that as the reel rotates the pick up teeth pass between adjacent rake bars 30 which are curved upwardly substantially with the same radius of curvature as the radius swept by the teeth of the rotating reel so that any material picked up by the teeth and the leading ends of edge 32 of the rake component, are moved upwardly by the rotating pick up reel teeth, to the upper end of the rake bars 30 and deposited over the end thereof as will hereinafter be described.

Hydraulic piston and cylinder assemblies 33 react between adjacent the upper rear side of the plates 13 and the frame and pivot the entire reel and rake component around the pivot points 15 so that the leading edges 32 of the rake component may be adjusted relative to the ground. Cylinders 33 are mounted on the ends of arms 33A which in turn are pivoted to the side at 33B. A heavy-duty spring 33C extends from intermediate the arms 33A to the rake assembly or component 32. This allows the rake component to float up with the spring tension if the rake strikes an underground obstruction.

A screening wheel collectively designated 34 is provided within the chassis rearwardly of the pick up reel and rake component, said wheel comprising a front circular member 35, a rear circular member 36 and a plurality of spaced and parallel screening bars 37 extending therebetween. In this particular embodiment, the front circular member 35 comprises an angle iron with the rear member 36 taking the form of a flat plate 36A with the plane of the plate extending radially inwardly to define a circular retaining flange as will hereinafter be described. The screening bars 37 are preferably angle irons with the enclosed angle facing outwardly and welded by the edges of the flanges to the angle front member 35 and being butted and welded against the rear plate 36.

In the modified arrangement shown in FIG. 1A the bars indicated at 37A are arranged at an angle of the order of 45° so that the front end of each bar is angularly advanced relative to the rear end in the direction of rotation of the wheel. This causes stones and material as the wheel rotates to be thrown or to fall away along the bars rearwardly relative to the wheel so that the wheel can be vertical as shown.

The teeth comprise plate members lying in a radial plane to the rear axis of rotation. Each is arranged to pass between two of the rake bars 30 as previously described. Alternate ones of the teeth 21, 21A of the bars 20A as shown are arranged such that one is offset on the bar from the next so that they are arranged forwardly and rearwardly respectively of the bar in the direction of rotation. The leading edge of each tooth lies radial or slightly forward and the trailing edge is inclined forwardly so that each tooth is tapered from the base toward the tip. In this way a wedge shape gap is formed as indicated at 21B between the trailing edge of one tooth and the leading edge of the next adjacent tooth. This prevents rocks wedging in between the teeth and helps reduce too rigorous working of the soil.

A track or channel 38 takes the form of an outwardly facing channel member and extends around the periphery of the wheel 34 intermediate the front and rear member 35 and 36 thereof with the edges of the angle iron flanges of the rake bars 37 being welded against the rear side of the channel 38.

Means are provided to support the screening wheel for rotation so that the wheel is journalled for rotation about a generally horizontal axis. Using the arrangement in FIG. 1A, the wheel is vertical with the stones thrown rearwardly by the inclined bars. Using the arrangement shown in FIG. 1, the axis can be inclined so that the upper side is above the container as shown.

The means for supporting the wheel for rotation within the supporting chassis includes a pair of main support wheels 39 each journalled upon a spindle 40 supported one upon each side of the longitudinal axis of the chassis by means of brackets or plates 41 extending outwardly from the chassis with the spindles 40 being mounted for rotation within bearings 42 and these main support wheels which are preferably rubber tired as indicated by reference character 43, engage the centrally located annular track channel 38.

Rear support wheels 39A and 39B are journalled upon spindles 40B supported within the support chassis. These wheels, which are three in number in the present embodiment, are equidistantly spaced and include the lower side wheels specifically designated 39A adjacent each side of the longitudinal axis and an upper wheel specifically designated 39B which is supported within an upward extension 40A of the chassis and substantially on the longitudinal axis thereof. These wheels, which are also rubber tired engage the rear plate 36 of the screening wheel with the axis of the rear support wheels lying parallel to the plane of the screening wheel as clearly illustrated thus giving adequate support for the screening wheel for rotation within the chassis. Retainer bar 38A is secured by one end to the upward extension 40A and extends forwardly to engage track 38 by a downturned end or shoe 38B to assist in retaining the wheel in position during rotation thereof.

Means are provided to drive the screening wheel and in this embodiment said means takes the form of a hydraulic motor 42 operatively connected by means of hoses 43 to a source of hydraulic power on the towing vehicle such as a tractor (not illustrated). A chain and sprocket assembly 44 operatively connects the hydraulic motor to the spindle 40 thereby driving one of the main support wheels 43 and hence driving the screening wheel.

The screening wheel is situated so that the lower portion 34A underlies the upper or rear end portion of the rake component so that material moved upwardly of the rake component by the pick up reel, is dumped into the lower portion and is temporarily retained by the flange 36A of the rear member 36 of the reel.

As the screening wheel is rotated, the screening bars 37A screen out the small stones, dirt and the like which drops onto the ground below. The larger rocks or stones, which are too large to pass through the gaps between the screening bars 37A, are carried upwardly and are rolled backwardly by the angled bars 37A as the wheel rotates to a position where they drop downwardly by gravity clear of the lower portion of the wheel, and into the open upper end 44 of a stone bucket collectively designated 45 mounted at the rear of the support chassis 10. This bucket includes a pair of spaced and parallel sides 46, a front side 47, a base 48 and a rear wall 49. It is pivoted upon pivot pins 50 to arms 51 which in turn are pivoted to upwardly extending support members 52 which are secured to the rear ends of the side chassis members 11.

Small rollers or wheels 46A are journalled one upon each rear side of the sides 46 and engage the front edges of the support 52 during part of the movement of the bucket for guiding and support purposes.

A pair of hydraulic piston and cylinder assemblies 53 are mounted by the lower ends thereof to the side chassis members 11 with the upper ends of piston rods 54 being pivotally connected to adjacent the upper edges of the side plates 46 of the bucket by means of pivot pin 55. These hydraulic piston and cylinder assemblies are operatively connected to the hydraulic system of the towing vehicle such as a tractor.

When it is desired to dump the stone bucket 45, the piston and cylinder assemblies are extended thus pivoting the bucket to the position shown in phantom in FIG.

1 whereupon the stones or rocks are dumped rearwardly into a pile whereupon the bucket can be returned to the stone or rock receiving position to receive further stones or rocks rom the screening wheel 34.

This device provides a relatively simple and heavy-duty rock picking assembly which can be used to pick up and screen rocks or stones together with soil from a field or, alternatively, is easily adapted for use picking up and screening by size, rocks or stones which have been windrowed.

Finally, a plurality of paddle assemblies collectively designated 56 may extend radially inwardly equidistantly around the inner periphery of the screening wheel 34. These can be formed from angle iron members 57, braces 58 and assist in the elevation of the larger rocks or stones which do not pass through the spaces between the bars 37 and elevate same to a height sufficient to drop them vertically to the stone bucket 45.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A stone picker assembly comprising in combination a wheel mounted supporting chassis, a pick up reel journalled for rotation in said chassis about an axis transversely thereof, a rake component supported in said chassis and inclining downwardly and forward for ground engagement by a leading edge thereof, and curved around said pick-up reel axis so that said reel conveys material upwardly along the rake component, said pick-up reel including a plurality of transversely extending spaced and parallel pick-up bars secured thereto parallel to said pick-up reel axis, said rake component including a plurality of spaced and parallel longitudinally extending bars, each of said pick-up bars carrying a plurality of teeth spaced therealong and arranged such that each tooth passes between a respective pair of adjacent longitudinally extending bars of said rake component as said reel rotates, each tooth comprising a flat plate member lying in a respective plane radial to said pick-up reel axis and defining a leading edge and a trailing edge which converge toward an end of the tooth of greater spaced from said pick-up reel axis, the teeth of each of said bars being arranged on the respective bar alternately forwardly and rearwardly of the bar relative to its direction of movement around the pick-up reel axis such that two adjacent teeth in side elevation define a generally wedge-shaped gap between a forward edge of one of the two and a trailing edge of the other of the two, a vertical cylindrical screening wheel journalled for rotation about a horizontal axis longitudinal of said chassis such that the wheel is situated behind said pick-up reel, means mounting said screening wheel for rotation and means to drive said screening wheel, said screen wheel having an open front face for receiving material from said reel and an open rear face for discharge therefrom of said stones, means to initially retain within said screen wheel said material from said reel deposited on the lower side of said wheel until said material is elevated to a predetermined level by rotation of said wheel, a stone receiving container in said chassis rearwardly of said screening wheel, and said means to move said container from a stone receiving position to a stone dumping position and vice versa, said screening wheel having a peripheral cylindrical surface formed from a plurality of parallel spaced slats extending from said open front face of the wheel to said open rear face thereof, the slats being arranged to lie at an angle to a line in the surface parallel to the axis of rotation thereof such that an end of each slat adjacent the front face rotates angularly advanced relative to an end thereof adjacent the rear face such that said slats constitute the sole means for throwing said stones from said wheel into said container.

2. The invention according to claim 1 in which said means mounting said screening wheel for rotation includes a track extending around the outer periphery of said screening wheel intermediate the front and rear edges thereof and at least two main support wheels journalled for rotation within said supporting chassis one upon each side of the longitudinal axis thereof, said main supporting wheels engaging said track and supporting said screening wheel.

3. The invention according to claim 2 in which said means mounting said screening wheel for rotation also includes a plurality of equidistantly spaced rear support wheels journalled for rotation within said supporting chassis rearwardly of said screening wheel, the rear side of said screening wheel resting upon said rear support wheels, the axes of rotation of said rear support wheels being parallel to the plane of said screening wheel.

4. The invention according to claim 2 in which said means to drive said screening wheel includes a source of power operatively connected to one of said main support wheels to rotate same and hence rotate said screening wheel.

* * * * *